United States Patent [19]

Shimizu et al.

[11] Patent Number: 4,998,770
[45] Date of Patent: Mar. 12, 1991

[54] ARMREST FOR MOUNTING ON A CONSOLE BOX

[75] Inventors: Takeshi Shimizu, Anaheim; Kenji Saito, Brea; Tomohisa Fushimi, Placentia; Gisela Huemann, Manhattan Beach; Jose M. Gonzales, Cerritos, all of Calif.

[73] Assignee: Suzuki Motor Corporation, Shizuoka, Japan

[21] Appl. No.: 399,821

[22] Filed: Aug. 29, 1989

[51] Int. Cl.⁵ .................................................. B60R 7/04
[52] U.S. Cl. .................................. 296/37.8; 224/42.42
[58] Field of Search .................... 296/37.8, 37.9, 37.14, 296/153; 224/273, 282, 42.42; 297/411

[56] References Cited

U.S. PATENT DOCUMENTS

| | | | |
|---|---|---|---|
| 4,423,812 | 1/1984 | Sato | 296/37.8 |
| 4,809,897 | 3/1989 | Wright | 224/282 |
| 4,818,008 | 4/1989 | Cressoni | 296/37.8 |
| 4,848,627 | 7/1989 | Maeda et al. | 224/42.42 X |

FOREIGN PATENT DOCUMENTS

| | | | |
|---|---|---|---|
| 180339 | 10/1983 | Japan | 296/37.8 |
| 61-96843 | 12/1986 | Japan | |
| 62-4030 | 1/1987 | Japan | |

Primary Examiner—Margaret A. Focarino
Assistant Examiner—Gary C. Hoge
Attorney, Agent, or Firm—Toren, McGeady & Associates

[57] ABSTRACT

An armrest includes a lower box having an insertion portion adapted to be inserted into a console box, a center box mounted on an upper side of the lower box and being angularly movable rearwardly, and an armrest lid mounted on an upper side of the center box and being angularly movable rearwardly. The console box has a lid secured to a body of the console box by a mounting mechanism, and the insertion portion is fixedly secured to the console box utilizing the mounting mechanism after the lid of the console box is removed from the console box. Each of the lower box and the center box has an article-holding container space. The center box has an upper portion extending forwardly progressively from a lower to an upper end of the upper portion, and the armrest lid is mounted on the upper portion of the center box.

3 Claims, 7 Drawing Sheets

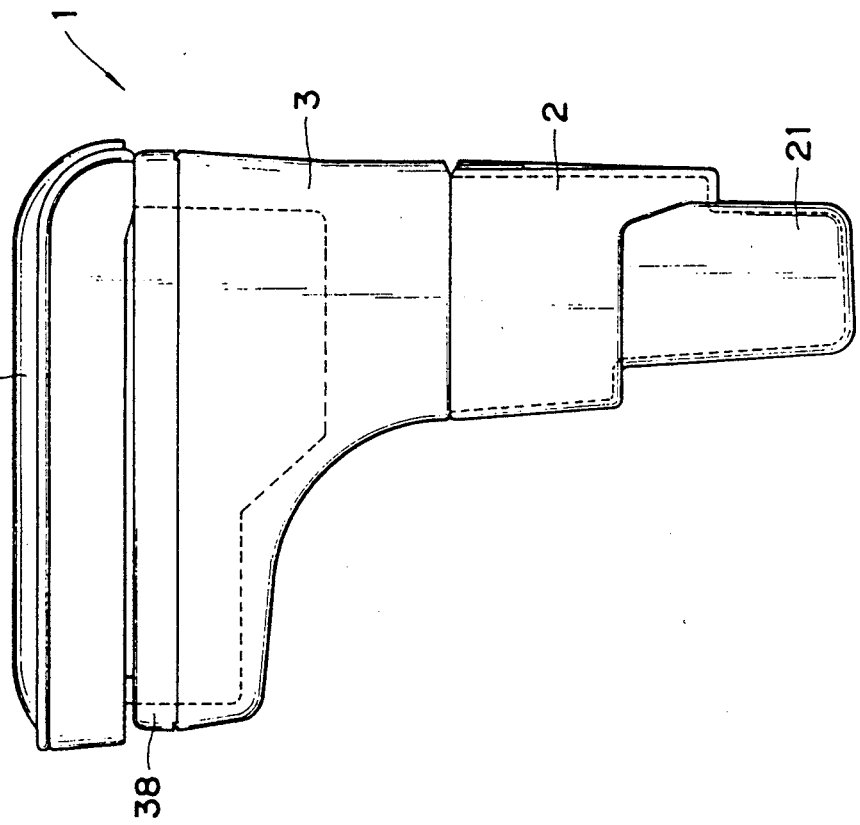
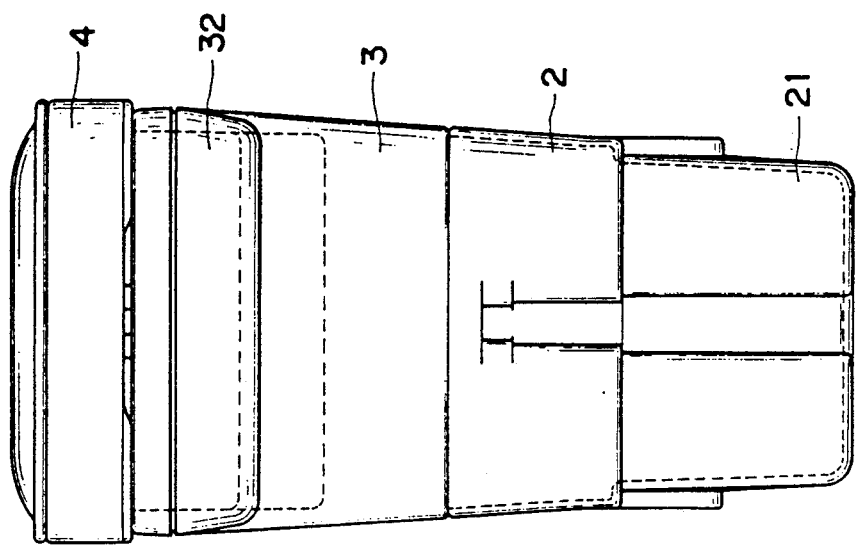

ARMREST FOR MOUNTING ON A CONSOLE BOX

FIELD OF THE INVENTION AND RELATED ART STATEMENT

This invention relates to an armrest adapted to be mounted on a console box of an automobile.

A console box is positioned between the driver's seat and the passenger's seat of an automobile.

Such console boxes of several unique designs are known in the art. For example, Japanese Laid-Open (Kokai) Utility Model Application No. 196843/86 discloses a console box for use in a vehicle in which a lid is mounted on the body of the console box so as to be movable between open and closed positions, and a container-supporting member is mounted on the lid.

The provision of an armrest between the driver's seat and the passenger's seat is often convenient for the passenger and the driver. In view of this, there has been proposed a combination armrest and console box, as disclosed in Japanese Laid-Open Utility Model Application No. 4030/87, in which the console box can be used as an armrest. As shown in FIGS. 10(a) and 10(b), this conventional console box assembly comprises the console box 101, and another box 103 angularly movably connected to the console box 101 by a link 102. More specifically, the link 102 is pivotally connected at one end to the console box 101 by a pin 104 whereas the other end of the link 102 is pivotally connected to the box 103 by a pin 105. With this construction, the box 103 is angularly movable relative to the console box 101. When the armrest is not used, the box 103 is angularly moved rearwardly as shown in FIG. 10(a), and in this condition articles can be put into and out of the box 103 through an opening 106 provided at the upper end of the box 103.

When this conventional console box assembly is to be used as an armrest, the box 103 is angularly moved forwardly to be placed on the upper surface of the console box 101, as shown in FIG. 10(b), so that the arm can rest on a side surface 107 of the box 103 disposed horizontally in FIG. 10(b).

OBJECT AND SUMMARY OF THE INVENTION

In the above conventional construction in which the console box is utilized as an armrest, the link 102 and the pin 104 must be additionally mounted on the console box 101, and a mounting hole for mounting the pin 104 on the console box 101 also has to be formed in the console box 101. Thus, with this conventional construction, the console box must be of a special design.

Further, as can be seen from FIGS. 10(a) and 10(b), the link mechanism is exposed to the exterior, and the box 103 which is not pleasing in appearance is disposed rearwardly of the console box 101 or placed on the console box 101. Therefore, the conventional construction is not desirable from the viewpoint of design.

It is therefore an object of this invention to provide an armrest for mounting on a console box of an automobile which armrest overcomes the above problems of the prior art.

According to the present invention, there is provided an armrest for mounting on a console box of an automobile, comprising a lower box having an insertion portion adapted to be inserted into the console box; a center box mounted on an upper side of the lower box and being angularly movable rearwardly; and an armrest lid mounted on an upper side of the center box and being angularly movable rearwardly.

The console box has a lid secured to a body of the console box by mounting means, and the armrest is fixedly secured to the console box utilizing the mounting means after the lid of the console box is removed from the console box. Each of the lower box and the center box has an article-holding container space. The center box has an upper portion extending forwardly progressively from a lower to an upper end of the upper portion, and the armrest lid is mounted on the upper portion of the center box.

With the above construction, the deficiencies of the prior art have been overcome.

BRIEF DESCRIPTION OF THE DRAWINGS

FIG. 2 is a side-elevational view of the armrest assembly;

FIG. 3 is a front-elevational view of the armrest assembly;

DETAILED DESCRIPTION OF PREFERRED EMBODIMENT

Figure 1:
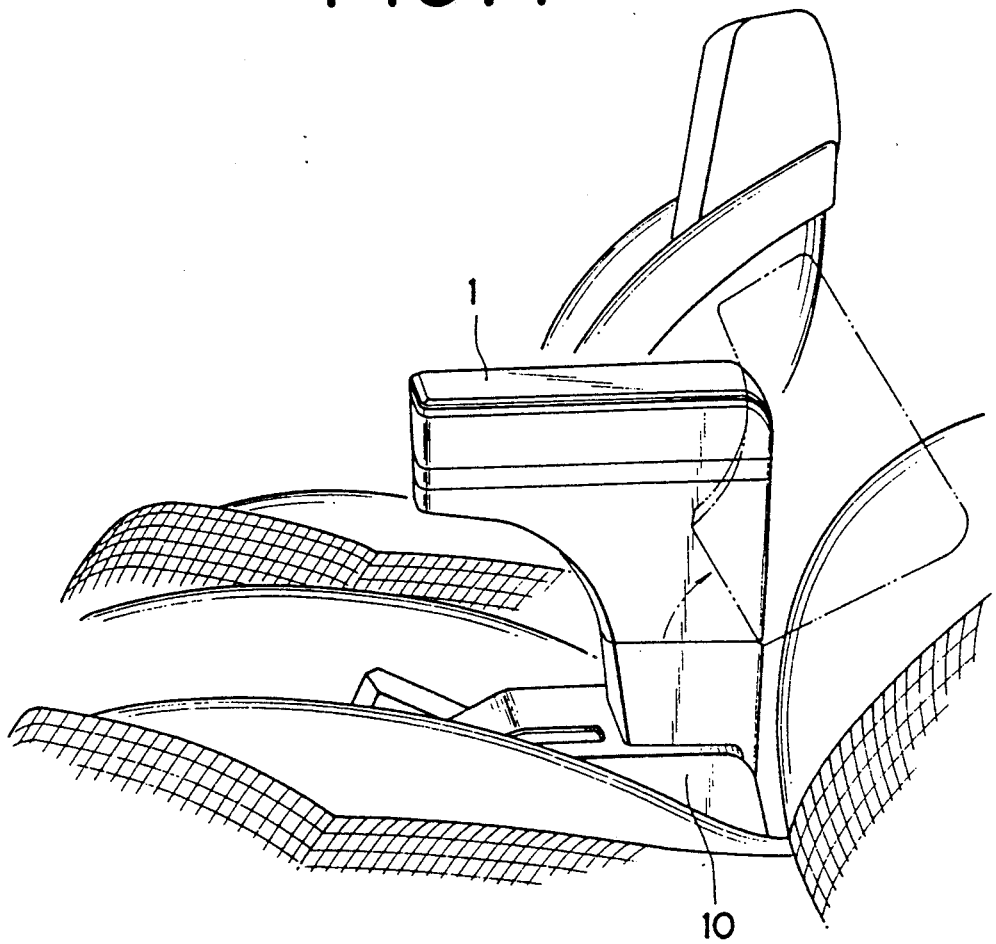
FIG. 1 is a perspective view of an armrest assembly of the present invention mounted between the driver's seat and passenger's seat of an automobile.

A preferred embodiment of the invention will now be described in detail with reference to the drawings.

As shown in FIGS. 1 to 6, an armrest assembly according to the present invention comprises, as main components, a lower box 2, a center box 3, and an armrest lid 4 serving as both a lid and an armrest member.

The lower box 2 and the center box 3 are connected together by a hinge 5 so that the center box 3 can be angularly moved rearwardly. The center box 3 and the armrest lid 4 are connected together by a hinge 6 so that the armrest lid 4 can be angularly moved rearwardly.

The lower box 2 has a lower portion serving as an insertion portion 21. The insertion portion 21 is so sized and shaped as to be snugly fitted into an article-holding container space 11 (FIGS. 7 and 8) of a console box 10 of an automobile so that the armrest assembly 1 can be mounted on the console box 10. The lower box 2 has a stepped portion 22 disposed adjacent to the insertion portion 21. A plurality of mounting holes 23 are formed through the stepped portion 22.

The lower box 2 has a bottom wall 24 defined by the lower end of the insertion portion 21. The lower box 2 has an internal space 25 extending from the bottom wall 24 to an open top of the the lower box 2, and the internal space 25 serves as an article-holding container space for holding articles therein.

An engaging member 26 of metal is mounted on the upper end of the lower box 2 at its front remote from the rear of the automobile.

The center box 3 has a lower portion 31, and an upper extension portion 32 extending forwardly progressively from the lower to upper end of the upper extension portion 32. The lower portion 31 is of such a size and shape that the outer peripheral surface of the lower portion 31 is smoothly continuous with the outer peripheral surface of the upper end portion of the lower box 2 when the center box 3 rests on the lower box 2. The center box 3 has an internal bottom surface 34, and an internal space 35 of the center box 3 serves to hold articles therein.

A rectangular frame 38 is fixedly fitted on an upper end 33 of the center box 3. One leaf of the above-mentioned hinge 6 is fixedly secured to the rear portion of the frame 38, and an engaging member 36 of metal is mounted on the front portion of the frame 38. The center box 3 and the frame 38 may be molded into a one-piece construction. Also, the frame 38 may be omitted, in which case the one leaf of the hinge 6 and the engaging portion 36 are secured directly to the center box 3.

An engaging member 37 is mounted on the lower end of the lower portion 31 of the center box 3 at the front thereof. The engaging member 37 is releaseably engageable with the engaging member 26, mounted on the upper end of the lower box 2, when the center box 3 rests on the lower box 2.

In order that when the arm of the passenger or the driver contacts the upper surface of the armrest lid 4, he can have an agreeable feeling or touch, the armrest lid 4 is, for example, made of a material agreeable to the touch. Alternatively, a soft pad is incorporated in the armrest lid 4 to increase its thickness. An engaging member 41 of metal is mounted on the underside of the armrest lid 4 at a front portion thereof. The engaging member 41 is releaseably engageable with the engaging member 36, mounted on the center box 3, when the armrest lid 4 rests on the center box 3.

Figure 6:
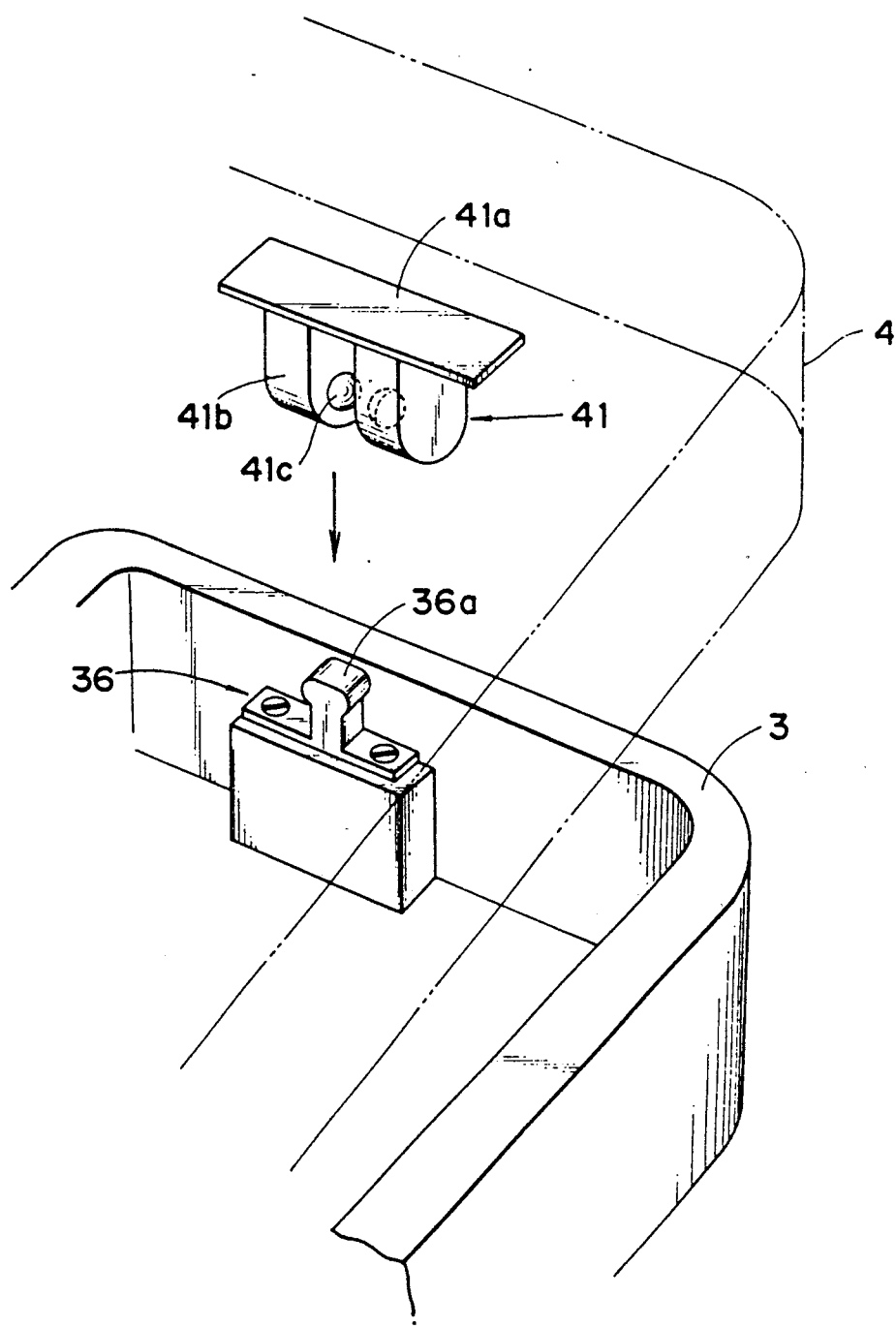
FIG. 6 is an enlarged perspective view of a portion of the armrest assembly, showing engaging members.

FIG. 6 shows one example of these engaging members. More specifically, the engaging member 41 comprises a base plate 41a, a pair of parallel spaced, opposed arms 41b and 41b formed on and extending perpendicularly from one side or face of the base plate 41a, and a pair of opposed balls 41c and 41c mounted respectively on the pair of arms 41b and 41b in such a manner that the pair of balls 41c and 41c partially project from the opposed surfaces of the two arms 41b and 41b toward each other. The pair of balls 41c and 41c are urged by urging means (not shown, e.g. spring), incorporated respectively in the pair of arms 41b and 41b, into their extended or projected positions. The pair of balls 41c and 41c are retractable.

The engaging member 36 includes an elongated projection 36a which is increased in width at its distal or upper end to provide an enlarged head. The projection 36a is inserted in between the pair of balls 41c and 41c and retained by them when the two engaging members 36 and 41 are engaged with each other. In this engaged or locked condition, because of the provision of the enlarged head of the projection 36a, the engaging member 41 can not be disengaged from the engaging member 36 so easily.

The engaging members 26 and 37 are similar in construction to the engaging members 36 and 41, respectively.

Figure 7:
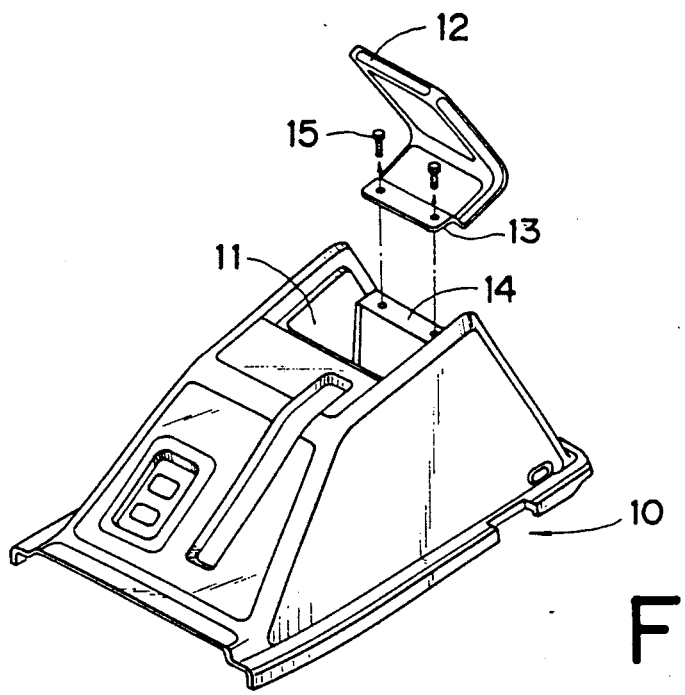
FIGS 7 to 9 are views illustrative of the manner of mounting the armrest on a console box of the automobile.

FIG. 7 shows the console box 10 on which the armrest assembly 1 according to the present invention is to be mounted. More specifically, a lid 12 of an inverted L-shaped cross-section is connected to a stepped portion 14 of the body of the console box 10 through a hinge 13 fastened to the stepped portion 14 by mounting screws 15. Therefore, the lid 12 is angularly movable through the hinge 13 so as to open and close the open top of the article-holding container space 11 of the console box 10.

For mounting the armrest assembly 1 on the console box 10, the mounting screws 15 are first removed to remove the lid 12 from the console box body.

Figure 4:
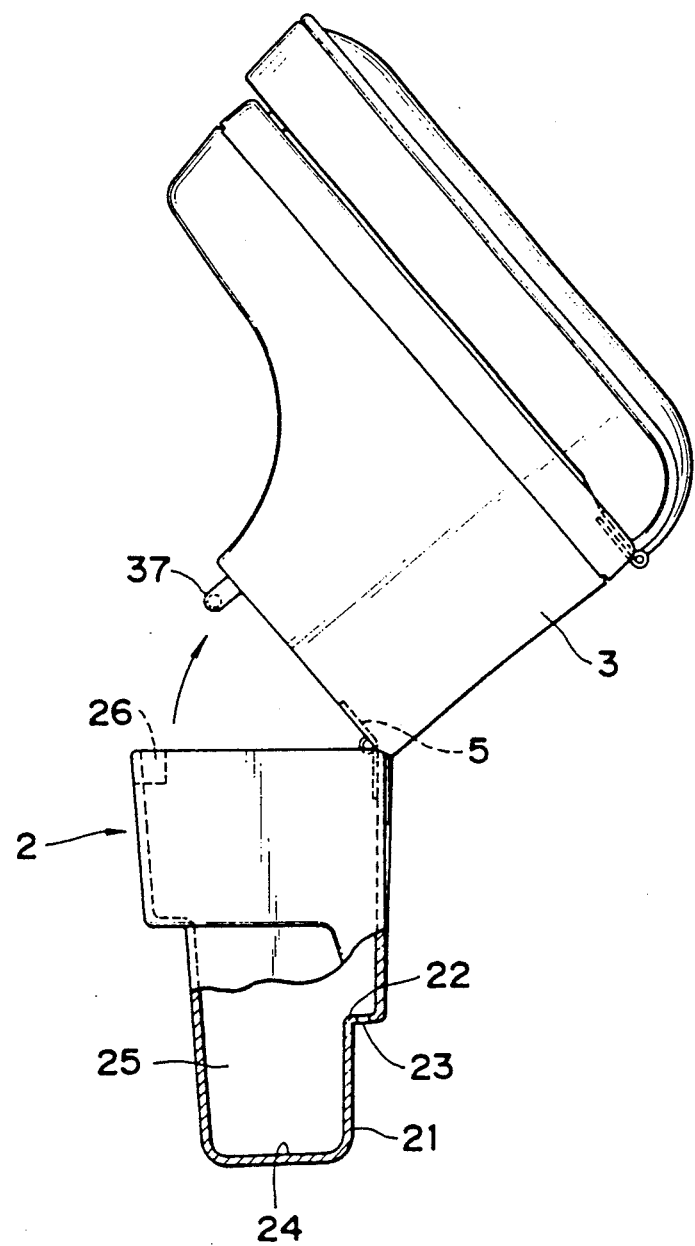
FIG. 4 is a partly-broken, side-elevational view of the armrest assembly, showing a center box in its open condition.
Figure 5:
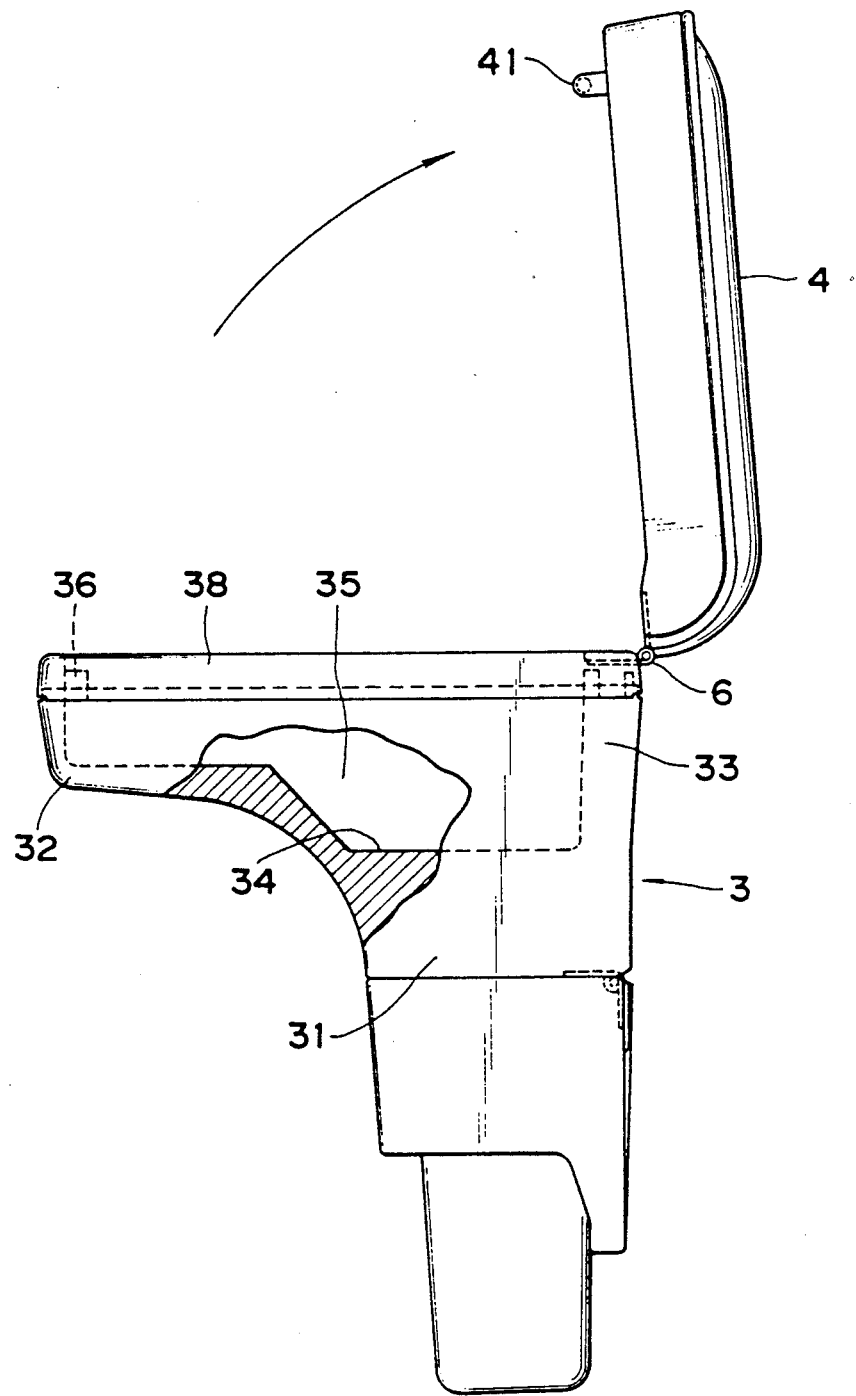
FIG. 5 is a partly-broken, side-elevational view of the armrest assembly, showing an armrest lid in its open condition.
Figure 8:
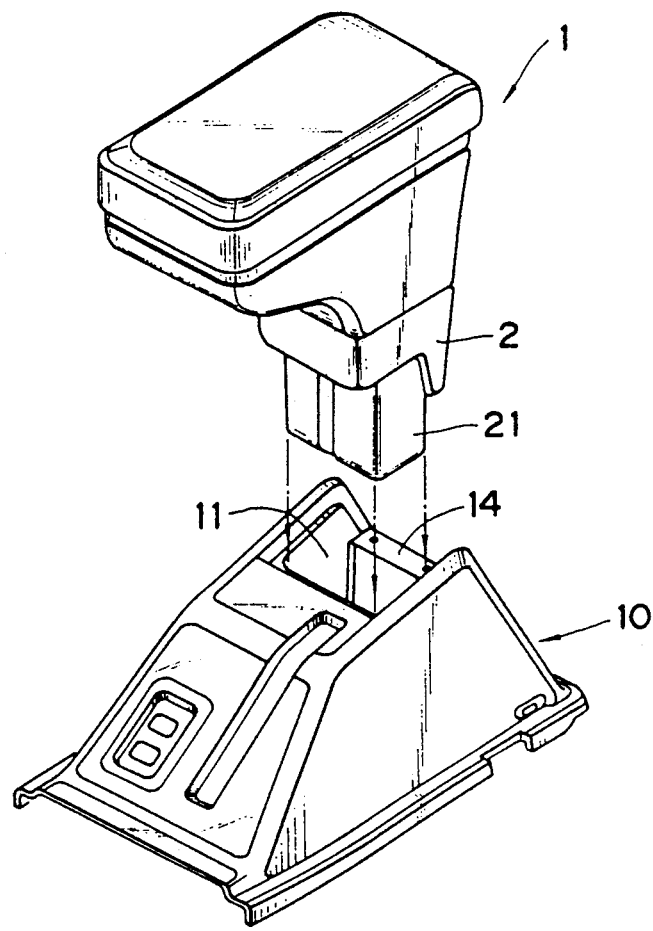

Then, as shown in FIG. 8, the insertion portion 21 of the lower box 2 is inserted into the article-holding container space 11 of the console box 10, with the lower surface of the stepped portion 22 of the lower box 2 abutting against the upper surface of the stepped portion 14 (see FIG. 4). In this condition, the insertion portion 21, which is complementary in cross-section to the article-holding container space 11 of the console box 10, is snugly fitted in the space 11 without any play therebetween.

Figure 9:
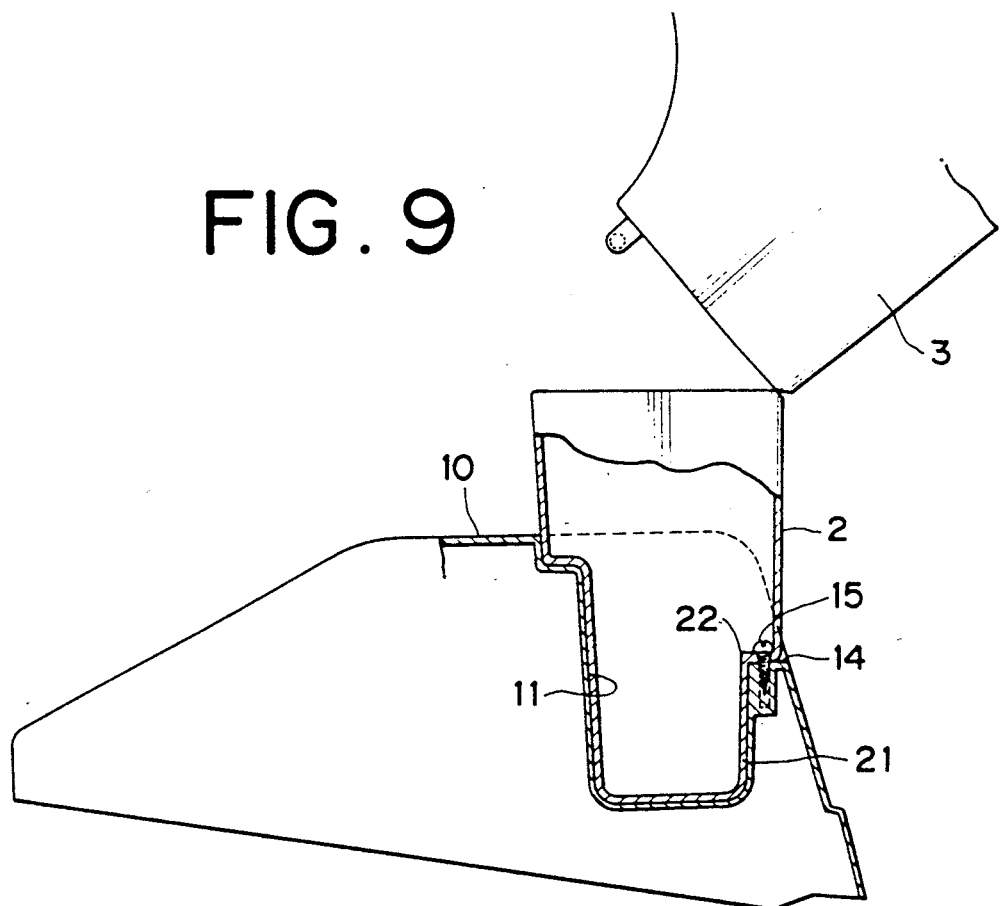
Figure 10A:
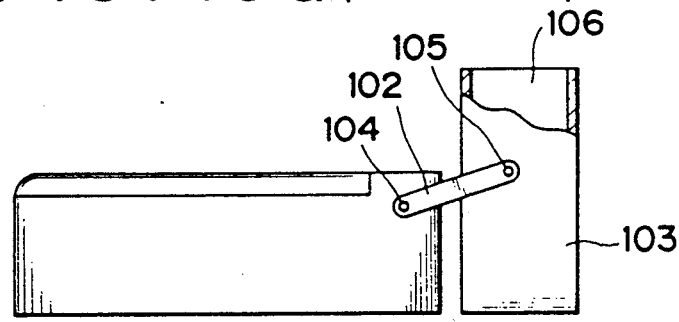
FIGS. 10(a) and 10(b) are views illustrative of the manner of use of a conventional armrest to be mounted on a console box of an automobile.
Figure 10B:
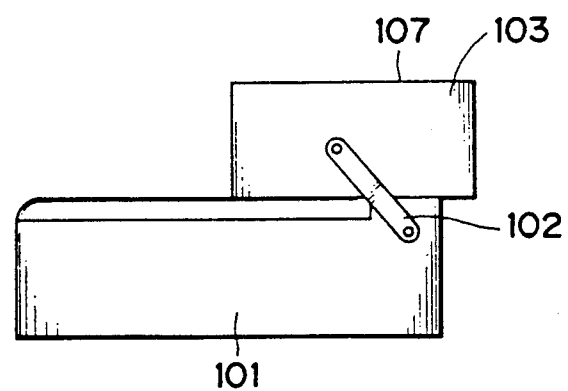

Then, as shown in FIG. 9, the mounting screws 15 are passed respectively through the mounting holes 23, formed through the stepped portion 21, and are threaded into the stepped portion 14 of the console box 10, thereby fastening the lower box 2 to the console box 10.

The manner of use of the armrest assembly 1 thus mounted on the console box 10 will now be described. When the armrest assembly 1 is mounted on the console box 10, the armrest assembly 1 is arranged between the driver's seat and the passenger's seat (that is, at the side of each of these two seats) in a condition shown in FIG. 1. Therefore, the driver or the passenger can rest his arm on the upper surface of the armrest lid 4. Thus, the armrest assembly 1 can be used as an armrest. When it is desired to put an article into and out of the armrest assembly 1, the front end of the armrest lid 4 is held by the hand, and the armrest lid 4 is opened or angularly moved rearwardly as indicated by an arrow in FIG. 5, so that the container space 35 of the center box 3 is accessible.

If the armrest is felt to be obstructive, the center box 3 is angularly moved rearwardly together with the armrest lid 4 as indicated by an arrow in FIG. 4 and shown in phantom in FIG. 1, so that the container space 25 of the lower box 2 is accessible. The container space 25 can be used as a secret box.

The armrest according to the present invention can be easily mounted, utilizing the console box of a standard design, and there is no need to manufacture a console box of a special design for the purpose of mounting the armrest.

After the armrest is mounted on the console box, the armrest can be held in its rear retracted position and therefore is not obstructive. Therefore, when the occupant of the automobile moves from one of the driver's seat and the passenger's seat to the other, the armrest will not interfere with such movement.

Further, the armrest is provided with the two container spaces for holding articles, and one of them can be used as a secret box.

Further, as a whole, the armrest of the present invention is more excellent in design than the prior art armrests.

We claim:

1. An armrest mountable on a console box having a lid, of an automobile, comprising:
    a lower box having an insertion portion insertable into said console box;
    a center box mounted on an upper side of said lower box and being angularly movable rearwardly;
    an armrest lid mounted on an upper side of said center box and being angularly movable rearwardly; and
    means for mounting said console box lid to said console box so that said console box lid can be removed from said console box, said insertion portion of said lower box being fixedly secured to said console box by said mounting means.

2. An armrest as defined in claim 1, wherein said center box has a reverse L-shape formed by a lower portion, and an upper extension portion gradually projecting forwardly from a lower end to an upper end.

3. An armrest as defined in claim 1, wherein each of said lower box and said center box have an article-holding container space.

* * * * *